United States Patent
Thioux et al.

(10) Patent No.: US 9,594,912 B1
(45) Date of Patent: Mar. 14, 2017

(54) RETURN-ORIENTED PROGRAMMING DETECTION

(71) Applicant: FireEye, Inc., Milpitas, CA (US)

(72) Inventors: Emmanuel Thioux, Santa Cruz, CA (US); Yichong Lin, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 49 days.

(21) Appl. No.: 14/311,014

(22) Filed: Jun. 20, 2014

Related U.S. Application Data

(60) Provisional application No. 62/009,128, filed on Jun. 6, 2014.

(51) Int. Cl.
   *G06F 21/57* (2013.01)
   *G06F 12/02* (2006.01)

(52) U.S. Cl.
   CPC .......... *G06F 21/577* (2013.01); *G06F 12/023* (2013.01); *G06F 2212/1052* (2013.01); *G06F 2221/033* (2013.01)

(58) Field of Classification Search
   CPC ... H04L 63/1433; G06F 21/577; G06F 12/023
   USPC .......................................................... 726/25
   See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,490,249 A | 2/1996 | Miller |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,108,799 A | 8/2000 | Boulay et al. |
| 6,118,382 A | 9/2000 | Hibbs et al. |
| 6,269,330 B1 | 7/2001 | Cidon et al. |
| 6,272,641 B1 | 8/2001 | Ji |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

*IEEE Xplore Digital Library Sear Results for* "detection of unknown computer worms". Http//ieeexplore.ieee.org/searchresult.jsp?SortField=Score&SortOrder=desc&ResultC . . . , (Accessed on Aug. 28, 2009).

(Continued)

*Primary Examiner* — Michael Pyzocha
*Assistant Examiner* — David Massie
(74) *Attorney, Agent, or Firm* — Rutan & Tucker, LLP

(57) ABSTRACT

According to one embodiment, a threat detection system is integrated with at least a dynamic analysis engine. The dynamic analysis engine is configured to automatically detect a function call by an application, responsive to detecting the function call, analyze contents located at one or more addresses located within a portion of memory allocated for the application, and, based on the analysis, determine whether one or more objects included in received network traffic is associated with a return-oriented programming (ROP) exploit.

29 Claims, 9 Drawing Sheets

(56) References Cited

U.S. PATENT DOCUMENTS

| | | |
|---|---|---|
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |

(56) References Cited

U.S. PATENT DOCUMENTS

| | | |
|---|---|---|
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |

(56) References Cited

U.S. PATENT DOCUMENTS

| | | |
|---|---|---|
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemel et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |

(56) References Cited

U.S. PATENT DOCUMENTS

| | | |
|---|---|---|
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0328204 A1 | 11/2014 | Klotsche et al. |
| 2014/0337836 A1 | 11/2014 | Ismael |
| 2014/0344932 A1* | 11/2014 | Polychronakis ........ G06F 21/54 726/23 |
| 2014/0351935 A1 | 11/2014 | Shao et al. |
| 2015/0096025 A1 | 4/2015 | Ismael |
| 2015/0128266 A1* | 5/2015 | Tosa ........................ G06F 21/52 726/23 |

FOREIGN PATENT DOCUMENTS

| | | |
|---|---|---|
| WO | WO-02/06928 | 1/2002 |
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | 2011/112348 A1 | 9/2011 |
| WO | 2012/075336 A1 | 6/2012 |
| WO | WO-2012/145066 | 10/2012 |
| WO | 2013/067505 A1 | 5/2013 |

OTHER PUBLICATIONS

*AltaVista Advanced Search Results.* "Event Orchestrator". Http://www.altavista.com/web/results?Itag=ody&pg=aq&aqmode=aqa=Event+Orchesrator . . . , (Accessed on Sep. 3, 2009).

*AltaVista Advanced Search Results.* "attack vector identifier". Http://www.altavista.com/web/results?Itag=ody&pg=aq&aqmode=aqa=Event+Orchestrator . . . , (Accessed on Sep. 15, 2009).

Cisco, *Configuring the Catalyst Switched Port Analyzer (SPAN)* ("Cisco"), (1992-2003).

Reiner Sailer, Enriquillo Valdez, Trent Jaeger, Roonald Perez, Leendert van Doorn, John Linwood Griffin, Stefan Berger, *sHype: Secure Hypervisor Appraoch to Trusted Virtualized Systems* (Feb. 2, 2005) ("Sailer").

Excerpt regarding First Printing Date for Merike Kaeo, *Designing Network Security* ("Kaeo"), (2005).

The Sniffers's Guide to Raw Traffic available at: yuba.stanford.edu/~casado/pcap/section1.html, (Jan.6, 2014).

*NetBIOS Working Group. Protocol Standard for a NetBIOS Service on a TCP/UDP transport: Concepts and Methods.* STD 19, RFC 1001, Mar. 1987.

"Network Security: NetDetector—Network Intrusion Forensic System (NIFS) Whitepaper", (*"NetDetector Whitepaper"*), (2003).

"Packet", *Microsoft Computer Dictionary*, Microsoft Press, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Abdullah, at al., *Visualizing Network Data for Intrusion Detection, 2005 IEEE Workshop on Information Assurance and Security*, pp. 100-108.

Adetoye, Adedayo , at al., "Network Intrusion Detection & Response System", (*"Adetoye"*), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", *Springer-verlag Berlin Heidelberg*, (2006), pp. 165-184.

Bayer, at al., "Dynamic Analysis of Malicious Code", *J Comput Virol.* Springer-Verlag, France., (2006), pp. 67-77.

Boubalos, Chris , "extracting syslog data out of raw pcap dumps, seclists.org, Honeypots mailing list archives", *available at* http://seclists.org/honeypots/2003/q2/319 (*"Boubalos"*), (Jun. 5, 2003).

Chaudet, C. , et al., "Optimal Positioning of Active and Passive Monitoring Devices" *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Cohen, M.I. , "PyFlag—An advanced network forensic framework", *Digital investigation 5*, ELSEVIER, (2008), pp. S112-S120.

Costa, M. , et al., "Vigilante: End-to-End Containment of Internet Worms" *SOSP '05, Association for Computing Machinery, Inc.*, Brighton U.K., (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , ""Zlib compressed data format specification version 3.3" RFC 1950, (1996)".

Distler, "Malware Analysis: An Introduction", *SANS Institute InfoSec Reading Room*, SANS Institute, (2007).

Dunlap, George W. et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

Filiol, Eric , et al., "Combinatorial Optimisation of Worm Propagation on an Unknown Network", International Journal of Computer Science 2.2 (2007).

Goel, et al., *Reconstructing System State for Intrusion Analysis, Apr. 2008 SIGOPS OPERATING Systems Review*, vol. 42 Issue 3, pp. 21-28.

Hjelmvik, Erik , "Passive Network Security Analysis with NetworkMiner", (*IN*)*SECURE*, Issue 18, (Oct. 2008), pp. 1-100.

Kaeo, Merike , "Designing Network Security", (*"Kaeo"*), (Nov. 2003).

Kim, H. , et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", (*"King"*).

Krasnyansky, Max , et al., *Universal TUN/TAP driver, available at* https://www.kernel.org/doc/Documentation/networking/tuntap.txt (2002) (*"Krasnyansky"*).

Kreibich, C. , et al., "Honeycomb-Creating Intrusion Detection Signatures Using Honeypots", *2nd Workshop on Hot Topics in Networks (HotNets-11)*, Boston, USA, (2003).

Kristoff, J. , "Botnets, Detection and Mitigation: DNS-Based Techniques", *NU Security Day*, (2005), 23 pages.

Liljenstam, Michael , et al., "Simulating Realistic Network Traffic for Worm Warning System Design and Testing", *Institute for Security Technology studies, Dartmouth College*, ("Liljenstam"), (Oct. 27, 2003).

Marchette, David J., "Computer Intrusion Detection and Network Monitoring: A Statistical Viewpoint", (*"Marchette"*), (2001).

Margolis, P.E. , "Random House Webster's 'Computer & Internet Dictionary 3rd Edition'", ISBN 0375703519, (Dec. 1998).

(56) References Cited

OTHER PUBLICATIONS

Moore, D., et al., "Internet Quarantine: Requirements for Containing Self-Propagating Code", *INFOCOM*, vol. 3, (Mar. 30-Apr. 3, 2003), pp. 1901-1910.

Morales, Jose A., et al., ""Analyzing and exploiting network behaviors of malware."" *Security and Privacy in Communication Networks*. Springer Berlin Heidelberg, 2010. 20-34.

Natvig, Kurt, "SandboxII: Internet", *Virus Bulletin Conference*, ("Natvig"), (Sep. 2002).

Newsome, J., et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).

Newsome, J., et al., "Polygraph: Automatically Generating Signatures for Polymorphic Worms" *In Proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual Is Better Than Real, Department of Electrical Engineering and Computer Science", *University of Michigan ("Chen")*.

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", *("Spizner")*, (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*. ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

Adobe Systems Incorporated, "PDF 32000-1:2008, Document management—Portable document format—Part1:PDF 1.7", First Edition, Jul. 1, 2008, 756 pages.

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Cisco "Intrusion Prevention for the Cisco ASA 5500-x Series" Data Sheet (2012).

Clark, John, Sylvian Leblanc,and Scott Knight. "Risks associated with usb hardware trojan devices used by insiders." Systems Conference (SysCon), 2011 IEEE International. IEEE, 2011.

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek- .com/microsofts-honeymonkeys-show-patching-wi/167600716 [retrieved on Sep. 29, 2014].

Heng Yin et al, Panorama: Capturing System-Wide Information Flow for Malware Detection and Analysis, Research Showcase © CMU, Carnegie Mellon University, 2007.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Mori, Detecting Unknown Computer Viruses, 2004, Springer-Verlag Berlin Heidelberg.

Oberheide et al., CloudAV.sub.—N-Version Antivirus in the Network Cloud, 17th USENIX Security Symposium USENIX Security '08 Jul. 28-Aug. 1, 2008 San Jose, CA.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Wahid et al., Characterising the Evolution in Scanning Activity of Suspicious Hosts, Oct. 2009, Third International Conference on Network and System Security, pp. 344-350.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

RETURN-ORIENTED PROGRAMMING DETECTION

CROSS-REFERENCE TO RELATED APPLICATIONS

This application claims the benefit of priority on U.S. Provisional Application No. 62/009,128, filed Jun. 6, 2014, the entire contents of which are incorporated by reference herein.

FIELD

Embodiments of the disclosure relate to the field of cyber security. More specifically, one embodiment of the disclosure relates to a system, apparatus and method for detecting a return-oriented programming (ROP) exploit based, at least in part, on instruction sequences stored at valid addresses located within a portion of memory allocated for an instance of an application; the application attempting to execute one or more objects contained within received network traffic.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by exploits, namely malicious computer code that attempts to take advantage of a vulnerability in computer software by acquiring sensitive information or adversely influencing or attacking normal operations of the network device or the entire enterprise network.

In particular, a malware writing technique known as ROP has become fairly widespread recently. ROP is an exploit that allows a writer of malware to chain together sequences of instructions through return instructions thereby accomplishing one or more tasks via the execution of the chain of sequences of instructions. ROP techniques were developed as a way to circumvent data execution prevention (DEP) techniques, which have been recently implemented in many operating systems to thwart unauthorized activities including malicious attacks.

A "DEP system" prevents the execution of portions of memory allocated by an application marked as "non-executable." For instance, areas of allocated memory that contain data as opposed to executable code may be marked as "non-executable." In particular, the stack and "virtual" heap of memory allocated by an application are typically marked as non-executable by default. Therefore, malware writers that previously inserted shellcode into the stack or virtual heap and executed an instruction to direct the execution flow to the inserted shellcode are not able to execute the inserted shellcode. A DEP system typically prevents malware writers from executing the inserted shellcode by causing the application to terminate.

In order to circumvent the protections established by a DEP system, malware writers turned to return-oriented programming Malware writers may accomplish tasks they would have inserted into the stack and/or virtual heap using shellcode by executing sequences of instructions already appearing in executable code, such as a dynamically-loaded library (DLL), loaded by the application. Using the ROP technique, malware writers search the areas of the allocated memory marked as "executable" (such as DLLs) for sequences of instructions that, chained together, accomplish any desired tasks. The sequences of instructions are chained together through the use of return instructions following the sequence of instructions. For example, the return instruction following sequence_1 will point to sequence_2. Therefore, merely performing a search of the stack or virtual heap for shellcode may not be sufficient to detect such exploits.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
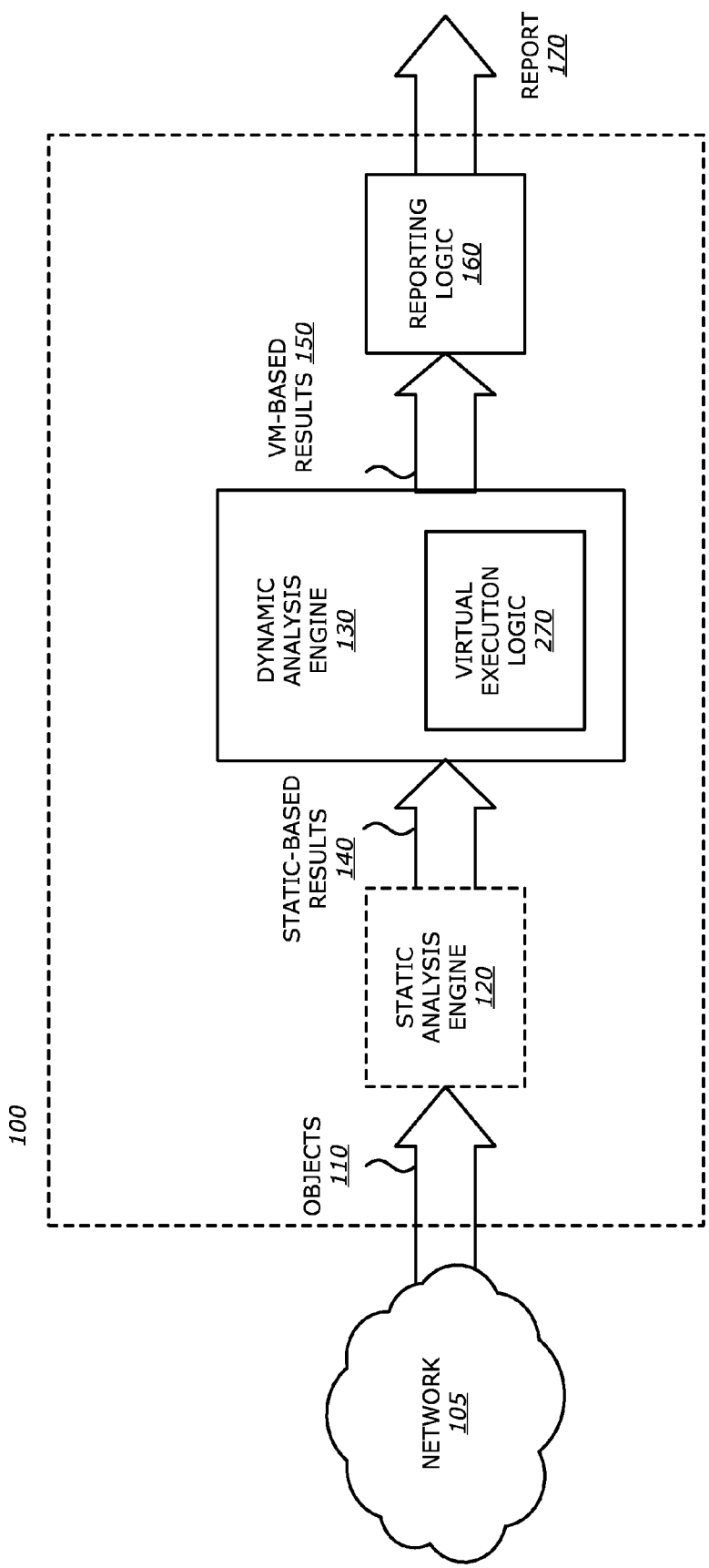
FIG. 1 is an exemplary block diagram of an operational flow for ROP exploit detection by a network device 100 (e.g., a TDP system).

Various embodiments of the disclosure determine whether an object of network content or other digital content is attempting to utilize a particular type of programming technique, return-oriented programming (ROP), to circumvent any malware detection or protection procedures employed by the network device, including data execution prevention (DEP) systems. This determination entails an analysis of an application's allocated memory and its contents to ascertain whether the contents correspond to a ROP exploit and the object should be classified as suspicious or even malware.

Specifically, in one embodiment, this determination explores the contents stored at addresses surrounding (within a predetermined address range of) a predetermined location (select address value) within the stack at a particular point in time. The contents stored on the stack within a particular distance from the predetermined location are analyzed to determine whether each is stored at a valid address in memory allocated to one of certain software modules (e.g., of the application being executed). If an address within the predetermined address range is not a valid address in memory allocated to one of the modules, its contents are disregarded for purposes of ROP detection. However, if an address within the predetermined address range is a valid address in memory allocated to one of the modules, the contents located at that address, and, in some embodiments, the next valid address or addresses in the stack, are further analyzed to determine if the address or addresses contain a gadget (i.e., computer code with less than a predefined number of instructions that are chained together followed by a "return" instruction). If they do contain one or more gadgets, a ROP exploit may have been uncovered. In some embodiments, depending on factors such as the number of detected gadgets, the object may be classified as "suspicious," that is, associated with a probable ROP exploit or malware or as "malicious," that is, associated with a high probability that the object is malware. In some embodiments, a correlation engine may associate the object with a score, weight or threat level corresponding to a probability that the object is associated with a ROP exploit, and may also classify the object as suspicious if the score exceeds a threshold, or even malicious if the score exceeds a higher threshold. In some embodiments, if a ROP exploit is detected, the object is always classified as malware.

Embodiments of the invention may be employed by or take the form of a network device or apparatus implementing a threat detection and prevention (TDP) system, where the network device has a dynamic analysis engine for monitoring and analyzing behavior of objects during processing in a virtual runtime environment. In some embodiments, the TDP system may be implemented or executed by a server or client device or other system (called an "endpoint") connectable to a network. In other embodiments, the TDP system may be a dedicated cyber-security appliance or general purpose computer system. The TDP system may include an optional static analysis engine as well as the dynamic analysis engine. According to one embodiment of the disclosure, the static analysis engine operates as a filter that analyzes information associated with characteristics of one or more objects extracted from monitored network traffic in efforts to determine if the characteristics are anomalous and thus indicative of an exploit. If so, the object(s) are labeled "suspicious". The dynamic analysis engine may include virtual execution logic to automatically process and analyze, without user assistance, content within object(s) of the received network traffic. Furthermore, the dynamic analysis engine may include monitoring logic to automatically instantiate and execute an application to execute or otherwise process an object within received network traffic and analyze the memory allocation for the application and patterns of instructions stored therein in order to detect a heap spray attack and/or an ROP exploit, in accordance with any of the techniques and embodiments described herein.

I. TERMINOLOGY

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data (e.g., digital values, which may include instructions, commands, statements, and other data), whether in transit (e.g., over a network) or at rest (e.g., stored), often having a logical structure or organization that enables the object to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes of data having a prescribed format, which may include packets, frames, or cells, and, within each, header, payload, etc.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similar, as another illustrative example, the object may be a self-contained element, where different types of such objects may include an executable file, non-executable file, a document (for example, a Microsoft Office® document), a dynamically linked library (DLL), a Portable Document Format (PDF) file, a JavaScript file, Zip file, a Flash file, an electronic mail (email), downloaded web page, an instant messaging element in accordance with Session Initiation Protocol (SIP) or another messaging protocol, or the like.

An "exploit" may be construed broadly as information (e.g., executable code, data, command(s), etc.) that attempts to take advantage of a vulnerability. Typically, a "vulnerability" is a coding error or artifact of software (e.g., computer program) that allows an attacker to alter legitimate control flow during processing of the software (computer program) by a network device, and thus, causes the network device to experience undesirable or unexpected behaviors. The undesired or unexpected behaviors may include a communication-based anomaly or an execution-based anomaly, which, for example, could (1) alter the functionality of an network device executing application software in a malicious manner; (2) alter the functionality of the network device executing that application software without any malicious intent; and/or (3) provide unwanted functionality which may be generally acceptable in another context. To illustrate, a computer program may be considered as a state machine, where all valid states (and transitions between states) are managed and defined by the program, in which case an exploit may be viewed as seeking to alter one or more of the states (or transitions) from those defined by the program.

Malware may be construed broadly as computer code that executes an exploit to take advantage of a vulnerability, for example, to harm or co-opt operation of a network device or misappropriate, modify or delete data. Conventionally, malware is often said to be designed with malicious intent. An object may constitute or contain malware.

The term "transmission medium" is a physical or logical communication path between two or more network devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "detected" is used herein to represent that there is a prescribed level of confidence (or probability) in the presence of an exploit or, in particular, a ROP exploit, within an object under analysis. For instance, the virtual execution logic may detect the presence of a ROP exploit by monitoring or observing unexpected or anomalous behaviors or activities, and, in response, determining that the object includes a ROP exploit.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, etc.

The term "gadget" may be construed as a sequence of computer instructions not including a "return" instruction (hereinafter referred to as "instructions") followed by a "return" instruction, where the sequence of instructions prior to the return instruction is less than a predefined threshold. A gadget may also consist solely of a return instruction. As an illustrative example, a gadget may be defined as any instruction sequence having less than ten instructions followed by a return instruction. Therefore, any instruction sequence consisting of more than one but less than a predetermined amount of instructions followed by a return instruction will be considered a gadget.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example of a specific virus or virus family (or other exploit), which is generated for instance as a hash of its machine code, and that is a special sub-case for purposes of this disclosure.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for detection, verification and/or prioritization of malicious content such as exploits, in particular, ROP exploits. As this invention is susceptible to embodiments of many different forms, it is intended that the present disclosure is to be considered as an example of the principles of the invention and not intended to limit the invention to the specific embodiments shown and described.

II. FIRST EMBODIMENT

ROP Exploit Detection within a TDP System

A. Operational Flow for ROP Exploit Detection

Referring to FIG. 1, an exemplary block diagram of an operational flow for ROP exploit detection by a network device 100 (e.g., a TDP system) is shown. Herein, some or all of the incoming objects 110 associated with monitored network traffic are received by virtual execution logic 270, which is part of a dynamic analysis engine 130 (see FIGS. 2A-2B), either directly or via an optional static analysis engine 120. According to one embodiment of the disclosure, when deployed in the network device 100, the static analysis engine 120 is configured as a capture and filter device that receives the incoming objects 110 and conducts heuristics (e.g., rules check), exploit signature checks and/or vulnerability signature checks on some or all of the objects 110, as described below.

The virtual execution logic 270 conducts an in-depth analysis of at least one object of the incoming objects 110 by instantiating a computer application to virtually process the object and analyze the contents within a portion of the stack of memory allocated by the application. Specifically, the virtual execution logic 270 determines whether the contents at each address of the stack represents a valid address located within a portion of memory allocated to a module of the application, such as a dynamically loaded library (DLL) or other module loaded by the application. If the address value represents a valid address located within a portion of memory allocated to the module, a portion of the virtual execution logic 270 may inspect the instruction sequence for a gadget, the instruction sequence located at that address and in valid addresses following that address.

Upon conducting at least an analysis of the addresses stored within a portion of the stack of an application used to execute at least one object of the incoming objects 110, the dynamic analysis engine 130 provides the results 150 of its analysis (referred to herein as "VM-based results"), including information regarding any uncovered gadgets, to reporting logic 160 for storage in database 255 and subsequent access. If implemented as part of the network device 100, the static analysis engine 120 may also provide results 140 of its analysis (referred to herein as "static-based results") in some embodiments to reporting logic 160 for storage in database 255 and subsequent access.

Thereafter, at least portions of the static-based results 140 and the VM-based results 150 for the incoming objects 110 may be combined by the reporting logic 160. The reporting logic 160 may issue an alert or report 170 (e.g., an email message, text message, display screen image, etc.) to security administrators to, for example, communicate the urgency in handling an uncovered ROP exploit or other exploit within the object of the incoming objects 110.

According to one embodiment of the disclosure, the communicative coupling between the static analysis engine 120 and the dynamic analysis engine 130 is provided in a serial configuration, where the incoming object(s) 110 (or a copy thereof) may be processed in the virtual execution logic 270 after analysis by the static analysis engine 120. However, the static analysis engine 120 and the dynamic analysis engine 130 may be provided in a parallel configuration, where the incoming object(s) 110 (or copy thereof) may be processed in the virtual execution logic 270 concurrently with analysis of objects by the static analysis engine 120.

B. General Architecture of Network Device Deploying a ROP Exploit Detection Logic Referring to FIG. 2A, an exemplary block diagram of a ROP exploit detection environment 200 deploying a plurality of threat detection and prevention (TDP) systems $210_1$-$210_N$ (N>1, e.g., N=3) communicatively coupled to a management system 220 via a network 225 is shown. The ROP exploit detection environment 200 comprises a server device 232, an optional firewall 236, a client device 234 and a TDP system $210_1$ communicatively coupled to the network 230 via a network interface 238. The TDP system $210_1$ is further communicatively coupled to the management system 220 and one or more TDP systems $210_2$-$210_3$ via the network 225. In general, management system 220 is adapted to manage TDP systems $210_1$-$210_3$. For instance, management system 220 is responsible for automatically updating a list of function calls to be observed by a portion of the virtual execution logic 270 and trigger the ROP exploit detection within some or all of TDP systems $210_1$-$210_N$.

Figure 2A:
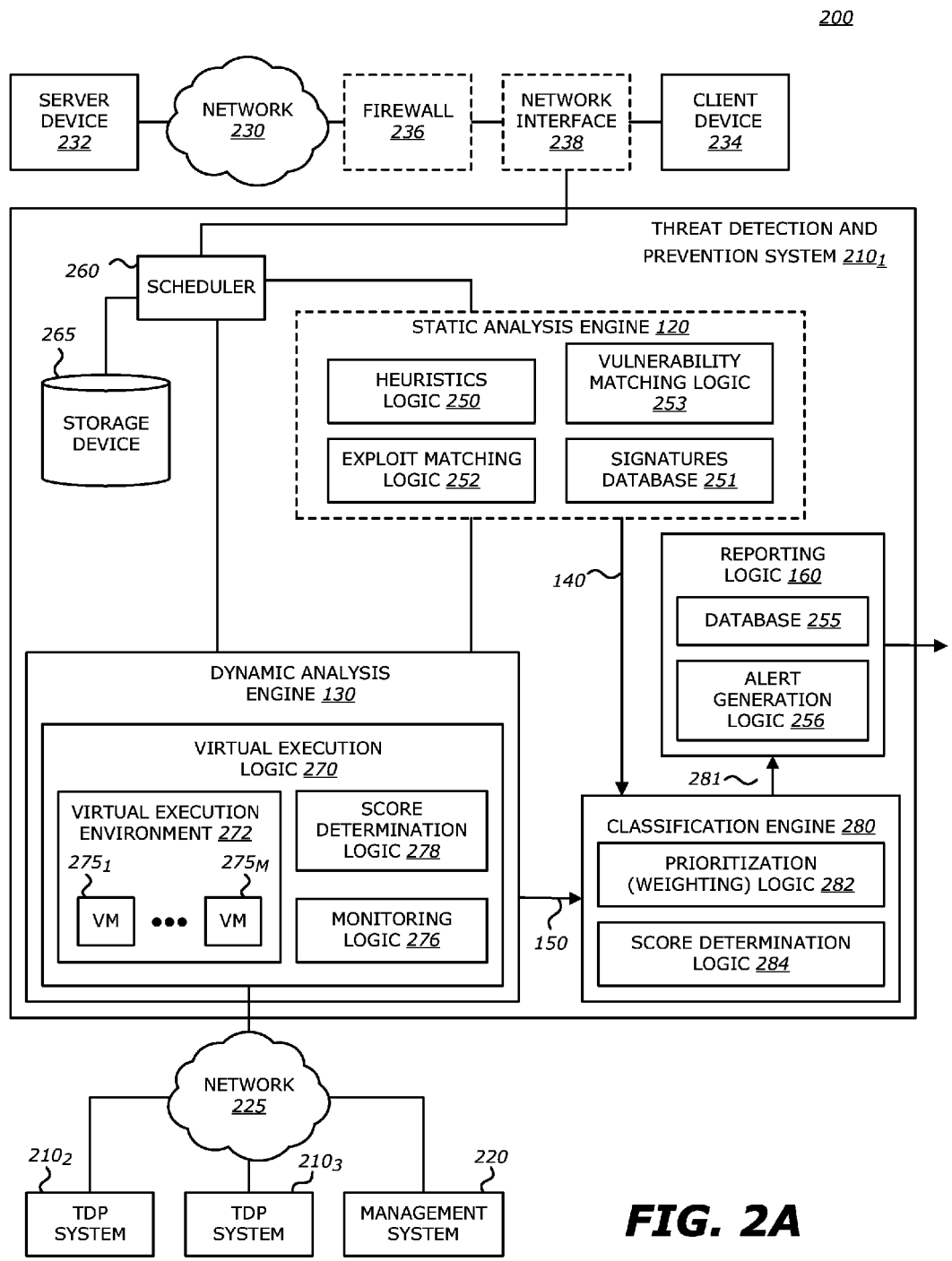
FIG. 2A is an exemplary block diagram of a ROP exploit detection environment deploying a plurality of threat detection and prevention (TDP) systems communicatively coupled to a management system via a network.

Herein, according to the embodiment illustrated in FIG. 2A, a first TDP system $210_1$ is a network device that is adapted to analyze information associated with network traffic routed over a communication network 230 between at least one server device 232 and at least one client device 234. The communication network 230 may include a public network such as the Internet, in which case an optional firewall 236 (represented by dashed lines) may be interposed prior to accessing client device 234. Alternatively, the communication network 230 may be a private network such as a wireless data telecommunication network, wide area network, a type of local area network (LAN), or a combination of networks.

Figure 2B:
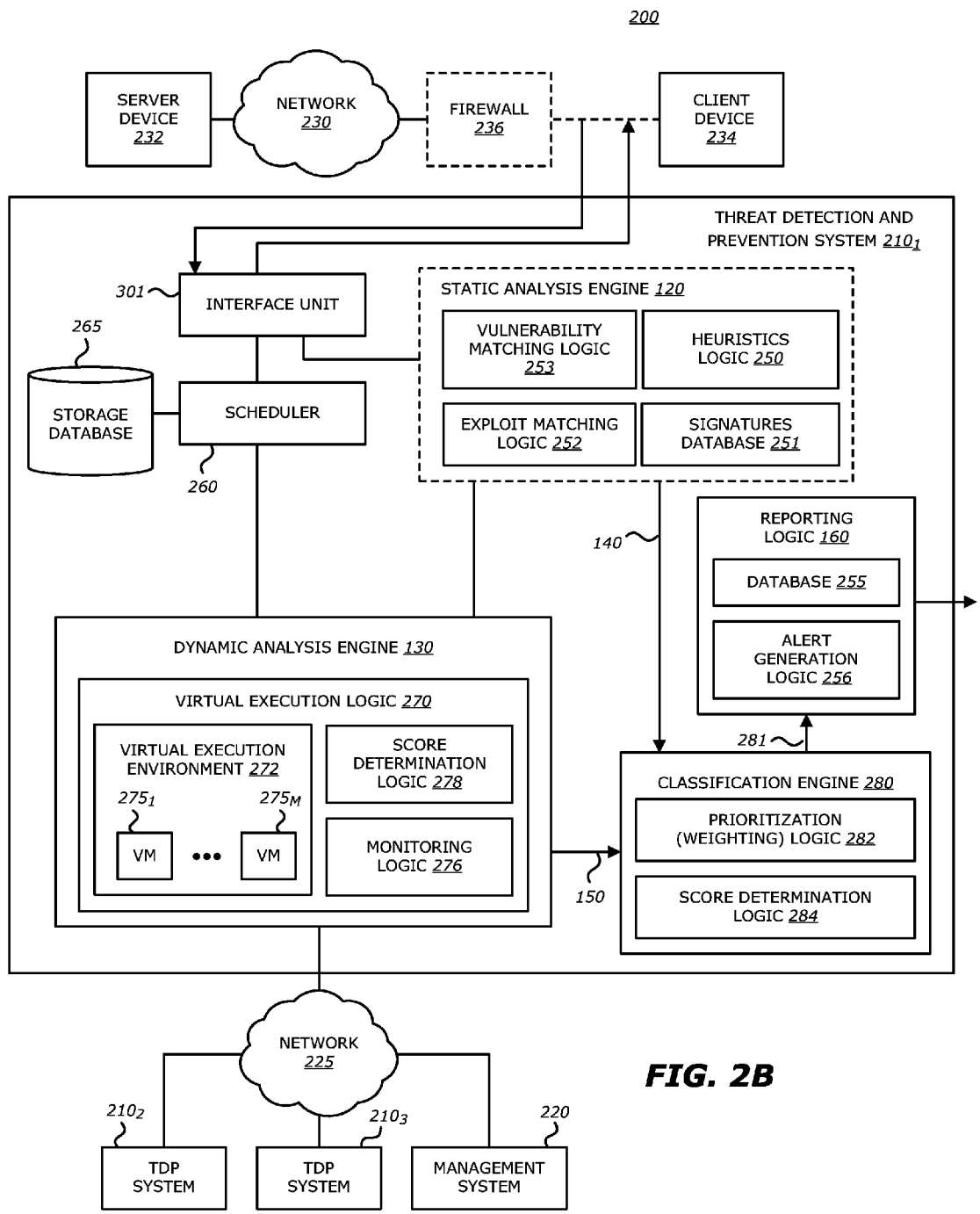
FIG. 2B is a second exemplary block diagram of a ROP exploit detection environment deploying a plurality of threat detection and prevention (TDP) systems communicatively coupled to a management system via a network.

As shown, the first TDP system $210_1$ may be communicatively coupled with the communication network 230 via a network interface 238. In general, the network interface 238 operates as a data capturing device (sometimes referred to as a "tap" or "network tap") that is configured to receive data propagating to/from the client device 234 and provide at least some of this data to the first TDP system $210_1$. Alternatively, as shown in FIG. 2B, the first TDP system $210_1$ may be positioned behind the firewall 236 and in-line with client device 234.

According to one embodiment of the disclosure, the network interface 238 is capable of receiving and routing objects associated with network traffic to the first TDP system $210_1$. The network interface 238 may provide the entire object or certain content within the object, for example, one or more files that are part of a set of flows, packet payloads, or the like. In some embodiments, although not shown, network interface 238 may be contained within the first TDP system $210_1$.

It is contemplated that, for any embodiments where the first TDP system $210_1$ is implemented as a dedicated appliance or a dedicated computer system, the network interface 238 may include an assembly integrated into the appliance or computer system that includes a network interface card and related logic (not shown) for connecting to the communication network 230 to non-disruptively "tap" network traffic propagating through firewall 236 and provide either a duplicate copy of at least a portion of the network traffic or at least a portion the network traffic itself to the dynamic analysis engine 130 and the optional static analysis engine 120, if included within the TDP system $210_1$. In other embodiments, the network interface 238 can be integrated into an intermediary device in the communication path (e.g., firewall 236, router, switch or other networked network device, which in some embodiments may be equipped with Switched Port Analyzer "SPAN" ports) or can be a stand-alone component, such as an appropriate commercially available network tap. In virtual environments, a virtual tap (vTAP) can be used to duplicate files from virtual networks.

As further shown in FIG. 2A, the first TDP system $210_1$ comprises the optional static analysis engine 120, a scheduler 260, a storage device 265, the dynamic analysis engine 130, a classification engine 280 and the reporting logic 160.

In some embodiments, as shown in FIGS. 2A-2B, the static analysis engine 120 may include one or more software modules that, when executed by one or more processors, performs static scanning on a particular object, namely heuristics, exploit signature checks and/or vulnerability signature checks for example. The static analysis engine 120 and the dynamic analysis engine 130 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

More specifically, as shown, static analysis engine 120 may be configured with heuristics logic 250, exploit matching logic 252, and/or vulnerability matching logic 253. Heuristics logic 250 is adapted for analysis of certain portions of an object under analysis to determine whether any portion corresponds to either (i) a statically determined communication protocol anomaly (e.g., HTTP, TCP, etc.) or other deviation from a predetermined rule or policy; (ii) a "suspicious" identifier such as either a particular Uniform Resource Locator "URL" that has previously been determined as being associated with known exploits or a particular source or destination (IP or MAC) address that has previously been determined as being associated with known exploits); (iii) a particular exploit pattern; or (iv) a particular shellcode pattern. When deployed, the exploit matching logic 252 may be adapted to perform exploit signature checks, which may involve a comparison of an object under analysis against one or more pre-stored exploit signatures (e.g., pre-configured and predetermined attack patterns) from signatures database 251. Additionally or in the alternative, the static analysis engine 120 may be configured with vulnerability matching logic 253 that is adapted to perform vulnerability signature checks, namely, detect identifiers within the object that correspond to an exploit directed to a known vulnerability in a computer application, for instance, a process of uncovering deviations in messaging practices set forth in applicable communication protocols (e.g., HTTP, TCP, etc.).

The static analysis engine 120 may route suspicious objects to the virtual execution logic 270 within dynamic analysis engine 130, and filter other "non-suspicious" objects from further analysis. In one embodiment, if the object is not suspected of being an exploit, the static analysis engine 120 may simply denote that the object is non-malicious. The dynamic analysis engine 130 is configured to provide an in-depth analysis of objects included in the received network traffic and/or suspicious object(s) from the static analysis engine 120. The analysis may include inspecting instruction sequences stored at particular addresses located within a portion of the memory allocated by application executed by one or more objects.

More specifically, if the optional static scanning is conducted, upon its completion, the static analysis engine 120 may provide a suspicious object to the dynamic analysis engine 130 for in-depth dynamic analysis using virtual machines (VMs) $275_1$-$275_M$ (M≥1). For instance, the dynamic analysis engine 130 may simulate transmission and/or receipt by a destination device comprising the virtual machine.

According to one embodiment, one or more VMs $275_1$-$275_M$ within the virtual execution environment 272 may be configured with one or more of the software profiles corresponding to the software images stored within storage device 265. Alternatively, the VMs $275_1$-$275_M$ may be configured according to a prevalent software configuration, software configuration used by a network device within a particular enterprise network (e.g., client device 234), or an environment that is associated with the object to be processed, including software such as a web browser application, PDF™ reader application, or the like. However, for a known vulnerability which occurs after a successful match during a vulnerability signature check for example, the VMs $275_1$-$275_M$ may be more narrowly configured to software profiles associated with vulnerable software. For example, a particular version of an application may be used by the VMs $275_1$-$275_M$.

The scheduler 260 may be adapted to configure the multiple VMs $275_1$-$275_M$ for concurrent (e.g., overlapping or simultaneous) virtual execution of a variety of different versions of the software, such as various operating systems, in efforts to detect whether an object included within the received network traffic is attempting to utilize a ROP exploit. Of course, the VM configuration described above may be handled by logic other than the scheduler 260. For instance, although not shown, the static analysis engine 120 and/or dynamic analysis engine 130 may include configuration logic to handle VM configuration as well.

Figure 3:
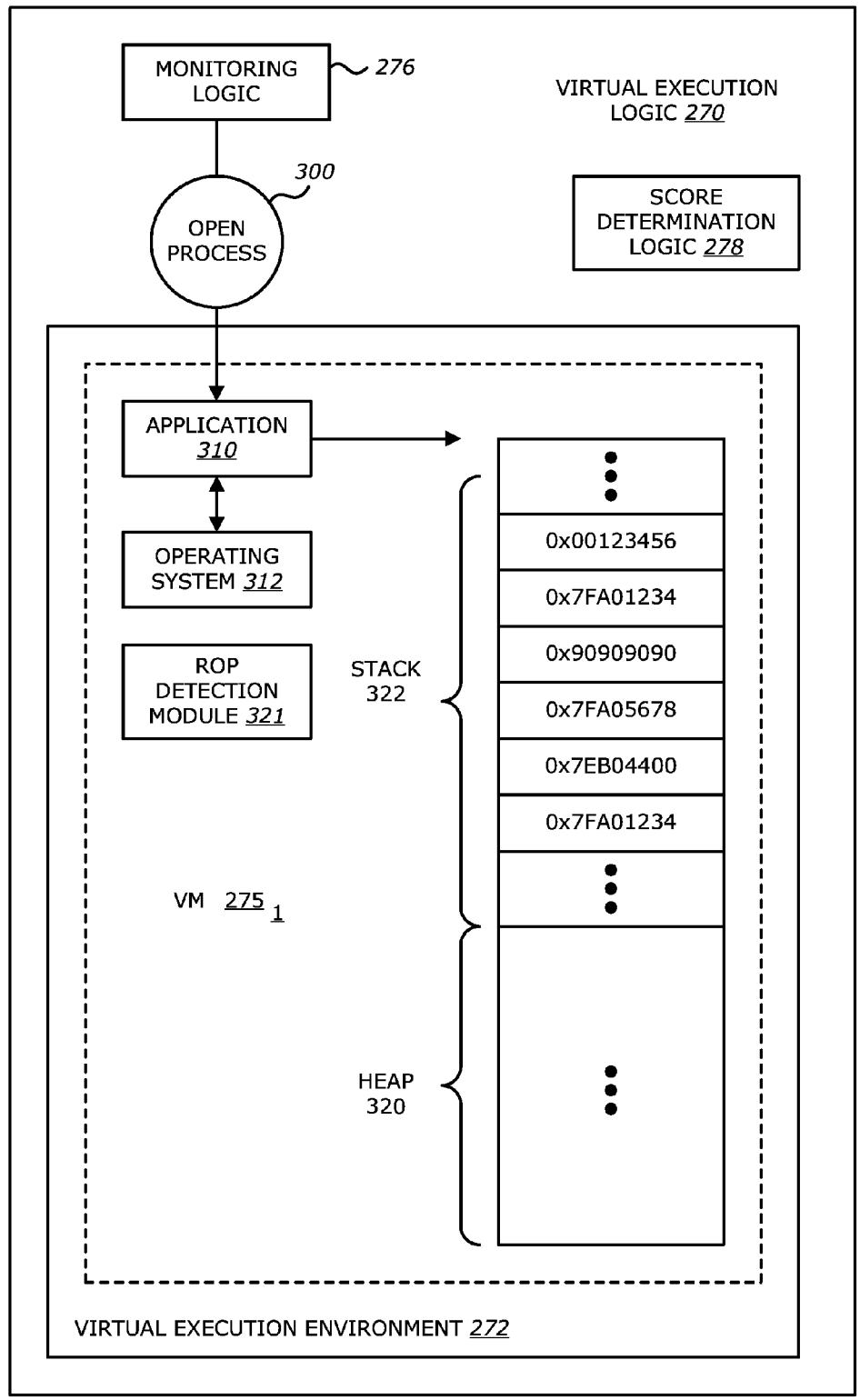
FIG. 3 is an exemplary block diagram of a monitoring logic and a ROP detection module to analyze the contents of a portion of the memory allocated by an application within a virtual machine (VM).

The dynamic analysis engine 130 is adapted to execute one or more VMs $275_1$-$275_M$ to detect an attempt to utilize a ROP exploit by simulating the execution of an object under analysis within a run-time environment as expected by the type of object. The dynamic analysis engine 130 analyzes the received network traffic and determines which application is suitable for executing an object of the received network traffic within one or more VMs $275_1$, . . . , and/or $275_M$. The monitoring logic 276 instantiates an instance of the application within the virtual execution environment 272 to open/execute the object. The monitoring logic 276 has a ROP detection module 321 (as seen in FIG. 3) that operates in association with the instantiated application in the VM(s) $275_1$-$275_M$ to monitor behaviors (e.g., activities) of the running application as it processes the object. The ROP detection module 321 analyzes addresses stored on a portion of the allocated memory, in particular, a portion of the stack allocated to the application, and determines whether a threshold number of gadgets have been chained together to conclude that the object contains, or is associated with, a ROP exploit. Alternatively, a weight may be attached to each instruction sequence, and the monitoring logic 321 may determine whether a ROP exploit is present based on a combined total of the weights given to the instruction sequences at the addresses within the portion of the stack.

The score determination logic 278 (which will be discussed in further detail below) may also be implemented within the virtual execution logic 270 to generate a score that represents a probability (or level of confidence) that the object under analysis is associated with a malicious attack. For instance, the score may be based, at least in part, on the VM-based results and, in some embodiments, on a combination of the static-based results and VM-based results.

The classification engine 280 may be configured to receive the static-based results 140 (e.g., results from static analysis, metadata associated with the incoming network traffic, etc.) and/or the VM-based results 150. According to one embodiment of the disclosure, the classification engine 280 comprises prioritization logic 282 and score determination logic 284. The prioritization logic 282 may be configured to apply weighting to results provided from dynamic analysis engine 130 and/or static analysis engine 250. Thereafter, the classification engine 280 may route the classification results 281 comprising the weighting and/or prioritization applied to the static-based results 140 and/or the VM-based results 150 to the reporting logic 160. The classification results 281 may, among others, classify the object as malware, classify the object as a member of a family of malware and/or exploits, describe the malware and/or exploits and provide the metadata associated with any object(s) within which the malware and/or exploits were detected. The alert generation logic 256 of the reporting logic 160 may generate an alert for the client device 234 and/or route the alert to the management system 220 via the network 225 for further analysis by a network administrator. In addition, the reporting logic 160 may store the classification results 281 (including the static-based results 140 and the VM-based results 150) in the database 255 for future reference. Finally, a signature for the malware or exploit may be generated and provided to one or more other systems to enable them to detect or classify objects matching the signature as malware in a more efficient manner.

Referring to FIG. 3, an exemplary block diagram of a monitoring logic and a ROP detection module to analyze the contents of a portion of the memory allocated for an application within a VM is shown. In the embodiment as shown, the virtual execution logic 270 comprises the monitoring logic 276, a score determination logic 278 and virtual execution environment 272 including one or more VMs, such as VM $275_1$. In the illustration, the monitoring logic 276 opens an instance of an application 310 (for example, a browser such as Internet Explorer®) through an open process operation 300.

The monitoring logic 276 observes the application 310 as it is allocated memory including a "virtual" heap 320 and a stack 322 within the VM $275_1$. The monitoring logic 276 is equipped with a ROP detection module 321, e.g., located within the virtual environment, which operates in conjunction with the application instance 310 (i.e., process) to obtain information and perform various tasks for the monitoring logic 276 such as, among others, detecting activities initiated by the application 310 and obtaining information required in detecting shellcode and/or a ROP exploit (to be discussed below). An operating system 312 may also be present within the VM 275$_1$. The application 310 and the ROP detection module 321 may communicate with the operating system 312. For example, the ROP detection module 321 may observe function calls made by the application 310 and/or querying the operating system 312 to determine what memory has been allocated to the application 310. Furthermore, the ROP detection module 321 may query the application 310 directly to determine what memory has been allocated to the application 310.

In particular, a portion of the monitoring logic 276 observes (i.e., performs an operation referred to as "hooking" or "intercepting") function calls initiated by the application 310. For example, if the VM 275$_1$ is executing a Microsoft® operating system, the ROP detection module 321 may observe function calls such as application programming interface (API) calls. In a second example, if the VM 275$_1$ is executing an Apple® operating system, such as OS X®, the ROP detection module 321 may observe function calls such as system calls. The observing of a function call by the ROP detection module 321 may trigger a ROP exploit detection process, as described below. The portion of the monitoring logic 276 performing functionalities described above and/or below may be referred to "ROP exploit detection logic."

Figure 4:
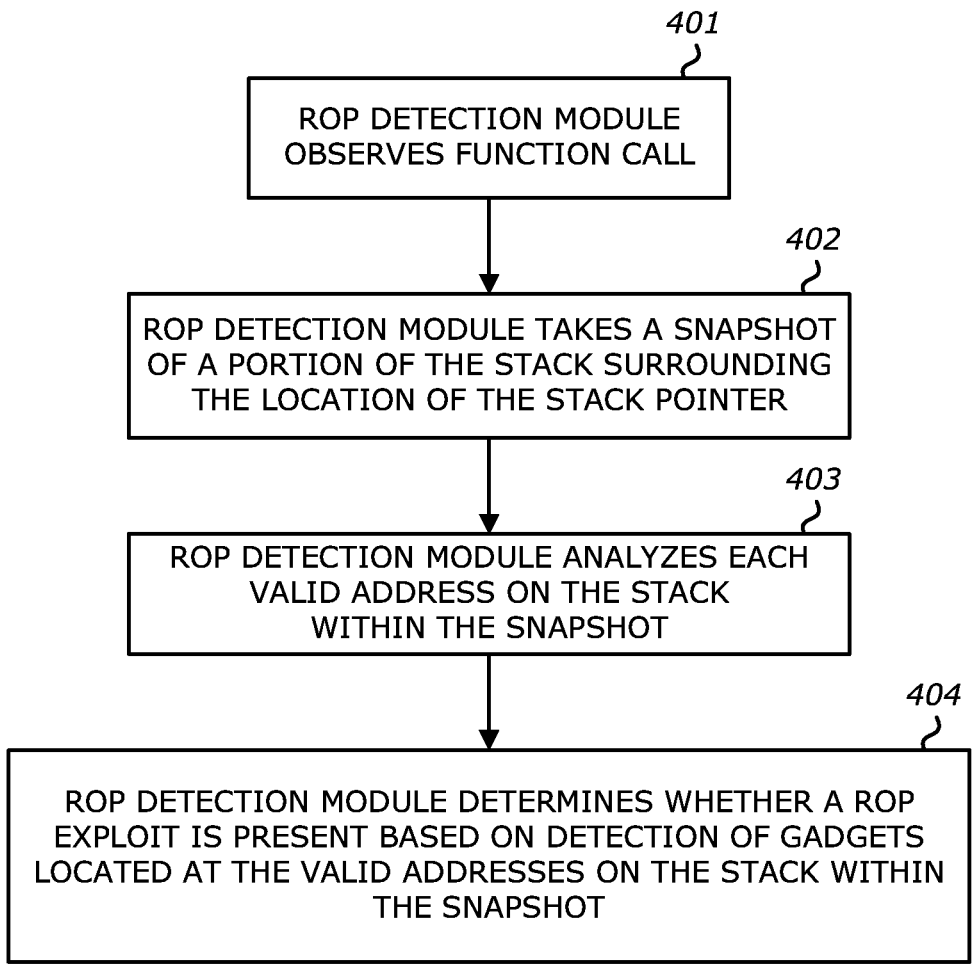
FIG. 4 is a flowchart illustrating an exemplary method for detecting a ROP exploit.

Referring to FIG. 4, a flowchart illustrating an exemplary method for detecting a ROP exploit is shown. In block 401, after the monitoring logic 276 has instantiated an instance of application 310 and the instance is executing in the VM, the ROP detection module 321 observes a function call made by the application 310.

Figure 5:
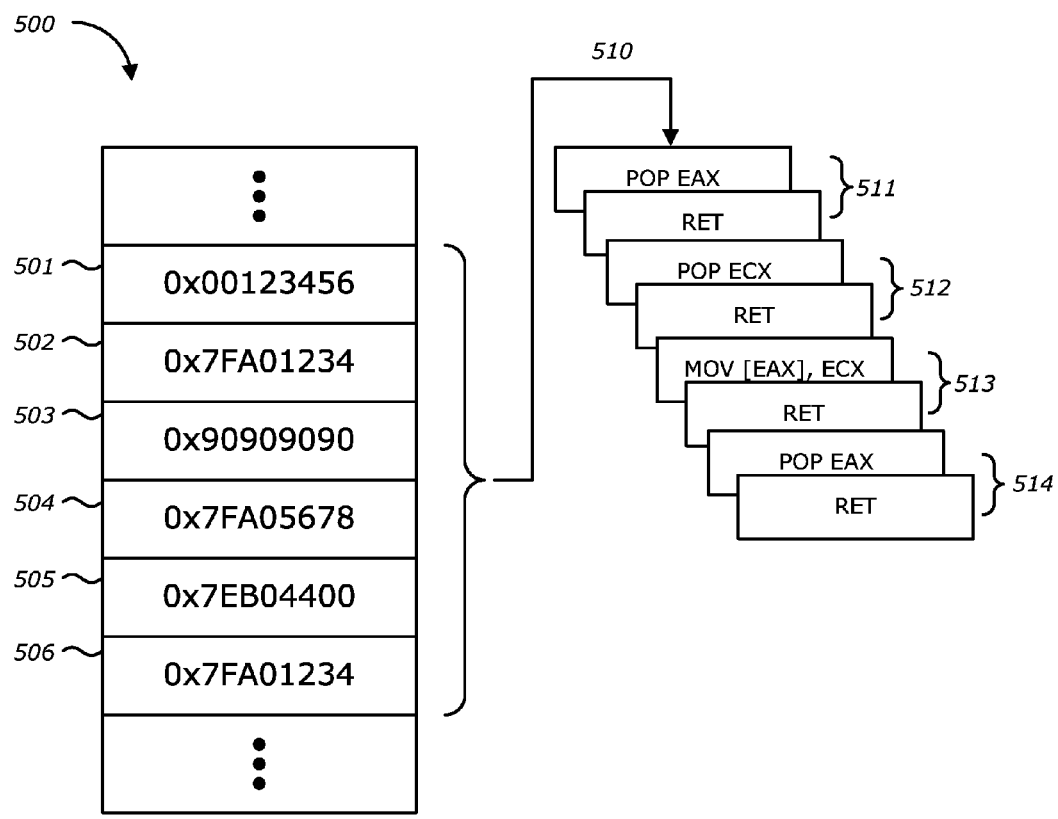
FIG. 5 is an exemplary block diagram of a portion of the stack allocated by an application of which a snapshot has been taken.

In block 402, the ROP detection module 321 takes a snapshot of a portion of the stack surrounding the location of the current position of the stack pointer (the portion of the stack of which the snapshot was taken will be referred to as "snapshot 500" as is seen in FIG. 5) at the point in time the function call is observed. The snapshot 500 captures the current content on the stack at addresses surrounding the stack pointer. The snapshot is captured so that the contents may be preserved for analysis, otherwise, for example, the contents might have been over-written and thus made not available. The range addresses (e.g., a number of addresses) included in the snapshot 500 may be predetermined number, and may be set or modified by, for example, a configuration file that is uploaded to the TDP system 210$_1$ by the management system 220. The snapshot may capture contents from a number of addresses prior to and a number of addresses following the current position of the stack pointer, which may be numerically the same or different.

Referring to FIGS. 3-5, in block 403, the ROP detection module 321 analyzes the addresses of all contents stored within the snapshot 500 to determine whether the address values represent "valid" addresses, that is, addresses of memory locations allocated to the application 310. The ROP detection module 321 will compare the address represented by each address value in the snapshot 500 against a list of allocated memory for the application obtained by querying the application 310 (or, in some embodiments, the operating system 312 as illustrated in FIG. 3) for metadata regarding the allocation.

In block 404 of FIG. 4, the ROP detection module 321 determines whether a ROP exploit is present in the contents based on the analysis of instruction sequences within the snapshot 500. In some embodiments, for each valid address, the ROP detection module 321 may analyze the contents of that address and, as appropriate, of one or more "next" address values for locations so long as they too have valid addresses. The ROP detection module 321 will examine the contents at that address or those addresses for an instruction sequence that represents a gadget. Thereafter, an alert may be generated by the ROP detection module 321 notifying the monitoring logic 276 of the presence of a ROP exploit.

Referring now to FIG. 5, an exemplary block diagram of a portion of the stack allocated by application 310 of which a snapshot has been taken is shown. Among the contents included in the snapshot 500, FIG. 5 shows the contents 501-506 as an illustrative example. The contents 502 and 504-506 are seen to represent memory addresses and will be compared to a list addresses allocated to application 310, as identified by metadata obtainable from the application 310. In contrast, the contents 501 and 503 represent addresses that are not valid for the application 310, and will be disregarded for purposes of analysis by the ROP detection module 321. The ROP detection module 321 inspects the contents of valid addresses for gadgets. For illustrative purposes, four gadgets are illustrated in FIG. 5 by the groupings of the instructions 511-514.

Figure 6:
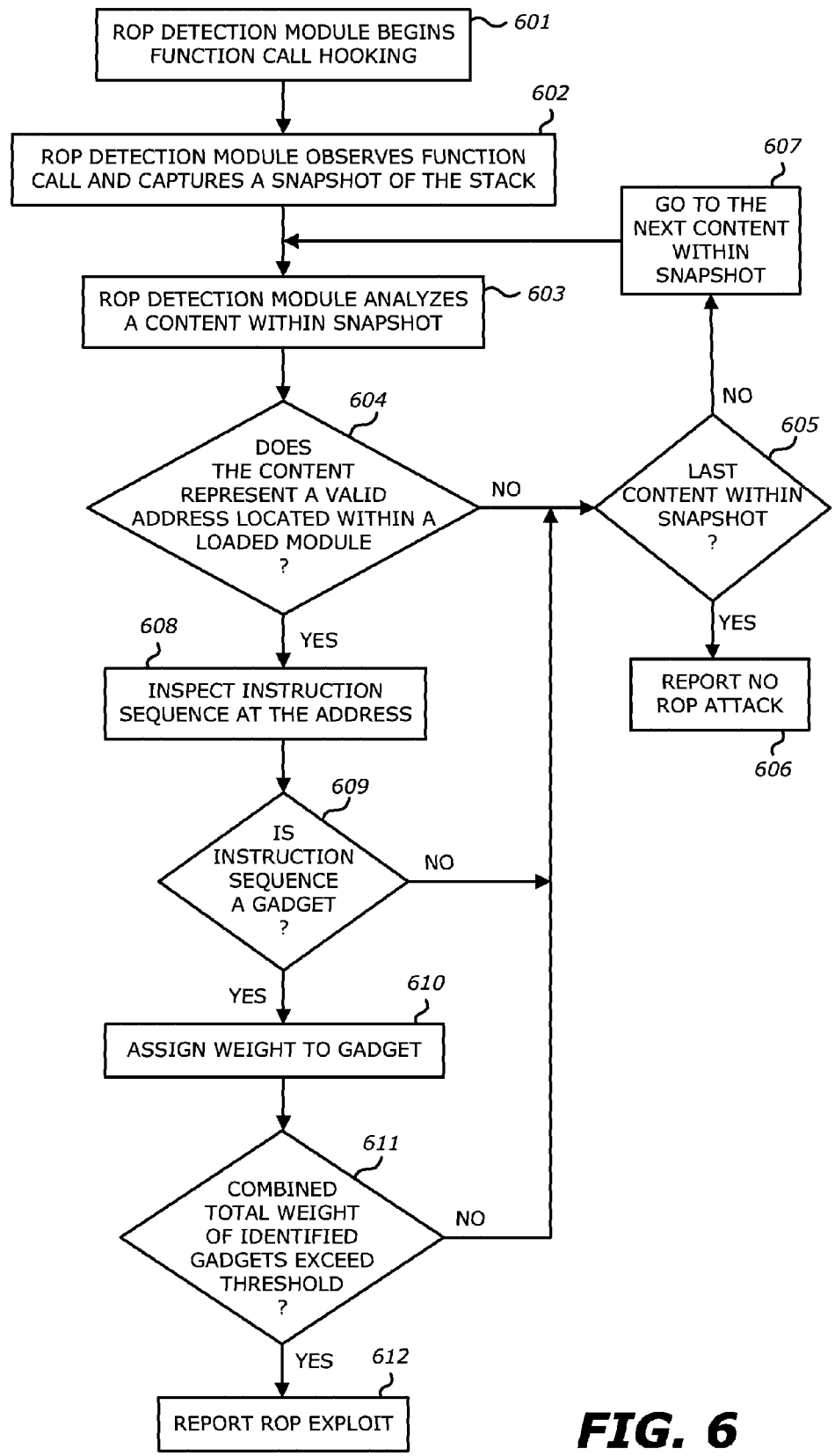
FIG. 6 is a flowchart illustrating an in-depth exemplary method for detecting a ROP exploit.

Referring to FIG. 6, a flowchart illustrating a more detailed in-depth exemplary method for detecting a ROP exploit in shown. As primarily shown in FIGS. 3 and 6, in block 601, the ROP detection module 321 begins to perform function call observing ("hooking") on the application 310, e.g., from within the VM 275 of FIG. 3. In block 602, the ROP detection module 321 observes a function call made by the application 310 and takes a snapshot 500 of the stack 322. In block 603, the ROP detection module 321 analyzes the contents within the snapshot 500. In block 604, the ROP detection module 321 determines whether a first content in the snapshot 500 represents a valid address of a location allocated to the application 310. If the content does not represent a valid address (block at block 604), the ROP detection module 321 checks whether the content being analyzed is the last content within the snapshot 500 (block 605). If the content currently being analyzed is the last content within the snapshot 500 (yes at block 605), the ROP detection module 321 disregards the function call made by the application 310 and returns to await a next function call, if any (block 606). However, if the content being analyzed is not the last content within the snapshot 500 (no at block 605), the ROP detection module 321 moves to the next content (block 607) and begins to analyze the next content as discussed above.

If the content being analyzed does represent a valid address for the application 310 (yes at block 604), the ROP detection module 321 inspects the instruction sequence located at the address (block 608). At block 609, the ROP detection module 321 inspects the sequence of instructions at valid addresses within the stack to determine whether the sequence of instructions is a gadget. The inspection of the sequence of instructions entails, at least, counting the number of instructions prior to a "return" instruction. If the number of instructions prior to a "return" instruction is below a first predetermined threshold, the sequence of instructions is considered a gadget.

If the instruction sequence is not determined to be a gadget (no at block 609), the ROP detection module 321 returns to block 605 and determines whether the content being analyzed is the last content within the snapshot 500. If the instruction sequence is determined to be a gadget (yes at block 609), the ROP detection module 321 may assign a weight to the instruction sequence based on the contents of the instruction sequence (block 610). For example, an instruction sequence comprised of more than one but less than nine instructions followed by a "return" instruction may be given a first weight whereas an instruction sequence comprising only a "return" instruction may be given a second, lower weight. The assigned weights may be based on experiential knowledge acquired through analysis of and, in some embodiments, machine learning from known malicious and non-malicious objects. Thereafter, in block 611, the ROP detection module 321 determines whether the combined total weight of all previously inspected instructions identified as gadgets exceeds a predetermined threshold weight. If the combined total weight does not exceed a predetermined threshold weight (no at block 611), the ROP detection module 321 returns to block 605 and checks whether the content being analyzed in the last content within the snapshot 500. However, if the combined total weight does exceed a predetermined threshold weight (yes at block 611), the ROP detection module 321 reports the presence of a ROP exploit (block 612).

In an alternative embodiment, the ROP detection module 321 may utilize a gadget counter instead of assigning weights to each identified gadget. In such an embodiment, when the ROP detection module 321 identifies an instruction sequence as a gadget, the ROP detection module 321 increments a gadget counter. If the gadget counter exceeds a predefined threshold defining the number of gadgets necessary to conclude a ROP exploit is present, the ROP detection module 321 may report the presence of a ROP exploit. However, if the gadget counter does not exceed the threshold defining the number of gadgets necessary to conclude a ROP exploit is present, the ROP detection module 321 returns to block 605 and determines whether the content being analyzed in the last content within the snapshot 500.

Although the ROP detection module 321 may perform ROP exploit detection logic (as described above) when a function call executed by the application 310 is observed, the ROP exploit detection logic may be triggered in some embodiments as a result of the ROP detection module 321 performing a stack discrepancy check. A stack discrepancy check involves analyzing a Thread Information Block (TIB). The TIB is a data structure that contains information regarding a currently running thread. The contents of the TIB include, among other things, an address representing the base of the stack of the application from which the thread was started and an address representing the limit of the stack. The base and stack addresses represent the range of the stack. During a stack discrepancy check, the ROP detection module 321 determines whether the current stack pointer is pointing to an address within the range represented by the base and stack addresses extracted from the TIB. If the current stack pointer is pointing to an address located within the range, no stack discrepancy is reported. However, if the current stack pointer is found to be pointing to a location outside of the range, a stack discrepancy is reported.

Therefore, in one embodiment of the disclosure, a stack discrepancy check may be performed by the ROP detection module 321 and, if a stack discrepancy is reported for a given application running, for example within the VM 275₁, the ROP exploit detection logic may be triggered.

Referring back to FIG. 2A, the score determination logic 278 within the dynamic analysis engine 130 may be configured to compute a score based on analysis of monitored behavior during execution of the application within the one or more VMs $275_1, \ldots,$ and/or $275_M$. According to one embodiment of the disclosure, the score determination logic 278 has one or more software modules that are used to determine a probability (or level of confidence) that the object contains a ROP exploit. As discussed above, the score determination logic 278 may assign a score based on one or more of (i) the static-based results 140, and/or (ii) VM-based results 150 which may include, among other things, an alert of a ROP exploit (or lack thereof) and/or the individual weights assigned to each gadget identified within a snapshot 500.

The scores may be given equal weighting or the weighting for one the static-based results 140 may differ from that given to the VM-based results 150 due to the accuracy of a set of results in detecting the presence of a ROP exploit and the likelihood of the detection resulting in a false positive.

C. Exemplary Logic Layout of TDP System

Figure 7:
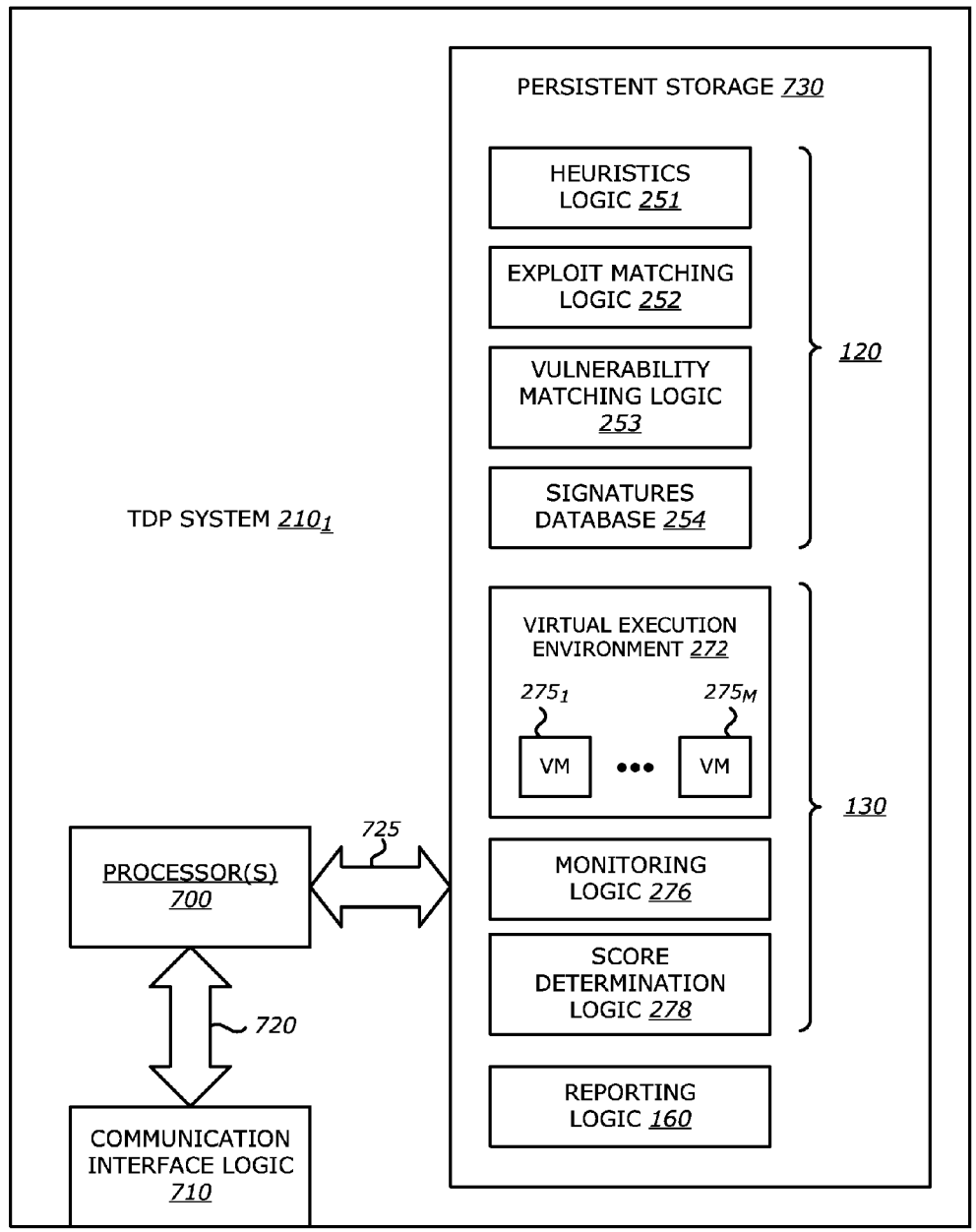
FIG. 7 is an exemplary block diagram of logic associated with the TDP system $210_1$ of FIGS. 2A-2B.

Referring now to FIG. 7, an exemplary block diagram of logic associated with the TDP system 210₁ of FIGS. 2A-2B is shown. The TDP system 210₁ comprises one or more processors 700 that are coupled to the communication interface logic 710 via a first transmission medium 720. Communication interface logic 710 enables communication with other TDP systems 210₂-210₃ and management system 220 of FIG. 2A-2B. According to one embodiment of the disclosure, the communication interface logic 710 may be implemented as a physical interface including one or more ports for wired connectors. Additionally, or in the alternative, communication interface logic 710 may be implemented with one or more radio units for supporting wireless communications with other network devices.

The processor(s) 700 is further coupled to the persistent storage 730 via the transmission medium 725. According to one embodiment of the disclosure, the persistent storage 730 may include (i) the static analysis engine 120 including the signatures database 254, the vulnerability matching logic 253, the exploit matching logic 252 and the heuristics logic 250; (ii) the dynamic analysis engine 130 including the virtual execution logic 272, the monitoring logic 276 and the score determination logic 278; and (iv) the reporting logic 160. Of course, when implemented as hardware, one or more of these logic units could be implemented separately from each other.

The static analysis engine 120, if included, comprises one or more software modules that conduct a first static analysis on one or more incoming objects. As described above, this analysis may involve performing at least exploit signature checks and vulnerability signature checks on each incoming object to determine whether characteristics of any of these objects are indicative of an exploit, and in particular, a ROP exploit. Upon detection that one or more suspicious objects have characteristics of an exploit, the static analysis engine 120 provides the suspicious object(s) to the virtual execution logic 270.

The virtual execution environment 272 comprises one or more software modules that are used for performing an in-depth, dynamic and real-time analysis of one or more objects included in the received network traffic using one or more VMs. More specifically, the virtual execution environment 272 is adapted to run one or more of the VM(s) $275_1$-$275_M$, which each virtually processes the content associated with the one or more objects within a computer application 310 in order to determine the presence of one or more exploits, and in particular, a ROP exploit. Furthermore, the monitoring logic 276 monitors in real-time during run-time, and may also log, at least the instruction sequences located at valid addresses allocated to the application 310 when the valid addresses correspond to contents within the snapshot 500. The monitoring logic 276 analyzes contents within the snapshot 500 of the stack and inspects the instruction sequence(s) located at one or more of the addresses to identify one or more gadgets.

Thereafter, according to the observed behavior of the virtually processed content, the monitoring logic 276 may determine that the content is associated with one or more exploits, and in particular, one or more ROP exploits, where the severity of the observed anomalous behavior and/or the likelihood of the anomalous behavior resulting from an exploit, is evaluated and reflected in a "score" assigned by the score determination logic 278. Processor(s) 700 may invoke the reporting logic 160, which produces an alert for conveying information regarding the detected ROP exploit by the TDP system 210₁.

III. ALTERNATIVE EMBODIMENT

ROP Exploit Detection within a Network Device

According to an alternative embodiment of the disclosure, a network device may be configured to implement at least a monitoring logic which may be communicatively coupled with a ROP exploit detection logic. In some embodiments, the ROP exploit detection logic may be co-located with the monitoring logic within the network device and in other embodiments may be located remotely with respect to the device. In other words, a network device may be equipped with integrated or embedded the monitoring logic, which performs its functions within the network device and communicates its results, e.g., over a dedicated communication link or network, to the ROP exploit detection logic.

Figure 8:
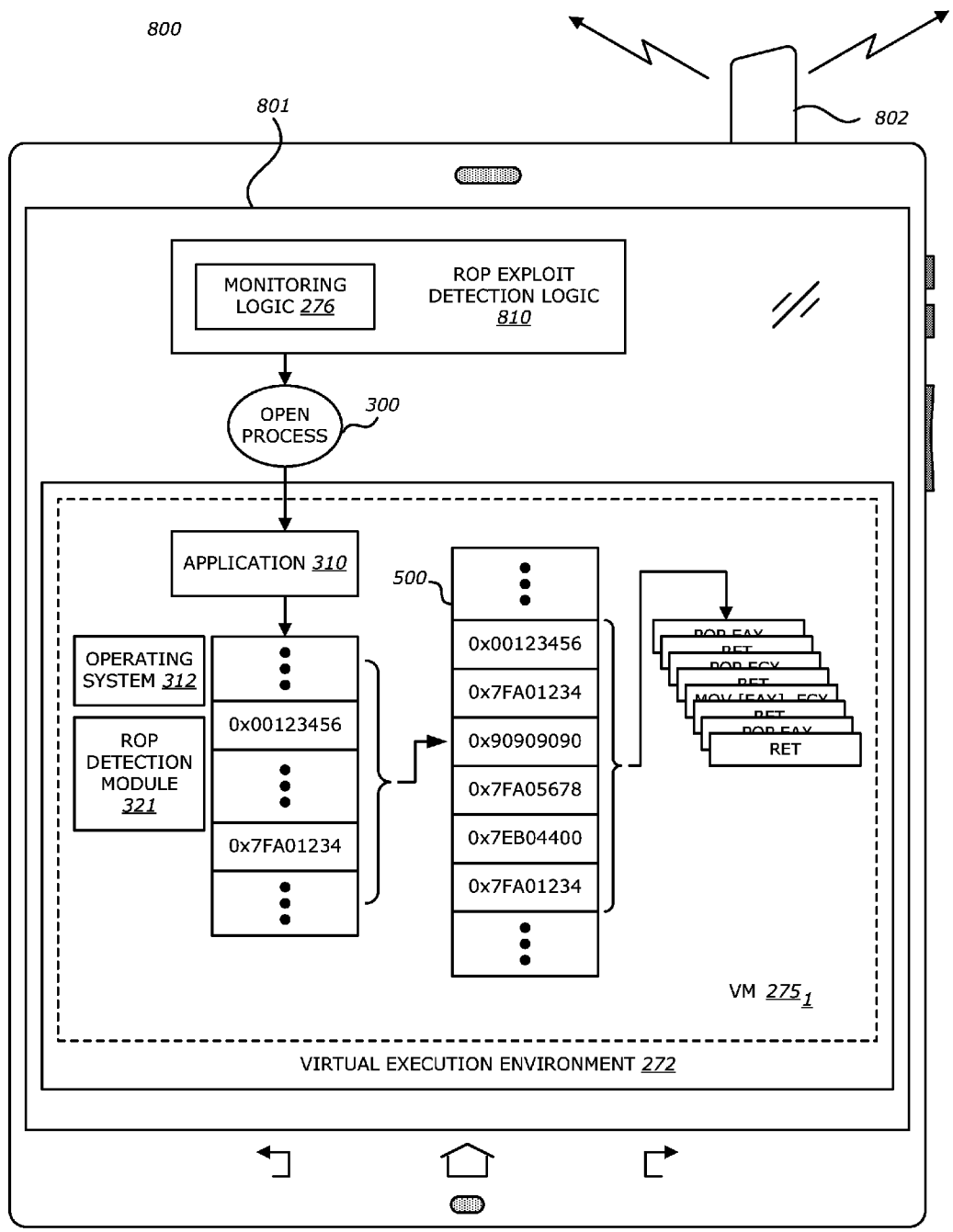
FIG. 8 is an exemplary illustration of a network device configured with a ROP exploit detection logic.

Referring to FIG. 8, a network device may be configured with a ROP exploit detection logic. In FIG. 8, the network device is represented by, as an illustrative example, a tablet 800. The tablet 800 includes a display screen 801, an antenna 802 and a ROP exploit detection logic 810. The ROP exploit detection logic 810 includes a monitoring logic 276 which may be equipped with a ROP detection module 321 for monitoring operations and other behavior of an application 310 from within the tablet 800.

In one embodiment, the ROP exploit detection logic 810 may be implemented as a software service within the tablet 800. In such an embodiment, the ROP detection module 321 performs function call observing ("hooking"). When a function call is observed, the ROP detection module 321 analyzes the actions taken by the tablet 800 as a result of the function call or system call to determine whether the object that made the call, contains, or is associated with, a ROP exploit. In one embodiment, the ROP exploit detection logic 810 may operate as a daemon such that the ROP exploit detection logic 810 runs as a background process on the tablet 800. In yet another embodiment, the ROP exploit detection logic 810 may be implemented as a software application on the tablet 800.

The ROP detection module 321 may capture and analyze the contents of a snapshot 500 of the memory allocated for the application 310 instantiated as a result of the function call. The ROP exploit detection logic 810 may analyze, as reported by the ROP detection module 321, information such as (i) the instruction sequences located at addresses included in the snapshot 500, (ii) the number of gadgets (i.e., instruction sequences containing certain characteristics such as less than a predetermined number of instructions prior to a return instruction), and/or (iii) a weight of each gadget assigned by the ROP detection module 321 during the execution of the application 310 in the VM 275₁.

One or more alerts generated by either, or both, the ROP detection module 321 and/or the ROP exploit detection logic 810 may be displayed to a user on the display screen 801. For example, when the combined total weight for all identified gadgets exceeds a predetermined threshold, an alert may be displayed on the display screen 801. Such alerts may present the user with the option to remediate the detected ROP exploit locally, i.e., on the tablet 800, or the option to store the information associated with the detected ROP exploit for remediation by the appropriate network administrator. One example of remediation that may occur locally is a system restore of the tablet 800 to system defaults. Furthermore, the information associated with the detected ROP exploit may be transmitted via the antenna 802 to the appropriate network administrator.

In addition to the generation of an alert, the ROP exploit detection logic 810 may prevent the application from executing on the tablet 800, outside of the confines of the VM 275₁. For instance, upon determination of the presence of a ROP exploit associated with application 310, the ROP exploit detection logic 810 may prevent the tablet 800 from executing an actual instance of the application outside of the virtual environment.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method, comprising:
    detecting a function call by an application;
    responsive to detecting the function call, capturing and preserving contents in a range of a stack of memory addresses surrounding a current stack pointer;
    analyzing contents located at a first valid address within the preserved contents to detect a first gadget and contents located at a second valid address within the preserved contents to detect a second gadget, the first valid address and the second valid address being located within a portion of a region of memory allocated for the application, wherein the first gadget comprises a first sequence of a first number of instructions less than a predetermined number of instructions followed by a return instruction, and the second gadget comprises a second sequence of a second number of instructions less than the predetermined number of instructions followed by a return instruction;
    assigning a first weight to the first gadget based on the first number of instructions and a second weight to the second gadget based on the second number of instructions, wherein the first weight is different than the second weight; and
    determining that a return-oriented programming (ROP) exploit is present within the portion of the region of allocated memory within the preserved contents based on at least whether a combination of at least the first weight and the second weight exceeds a predetermined weight threshold.

2. The computerized method of claim 1, wherein the first gadget includes (1) a sequence of one or more computer instructions other than a return instruction and (2) the return instruction following the sequence of one or more computer instructions, where a number of instructions forming the sequence of one or more computer instructions is less than a predefined threshold.

3. The computerized method of claim 2, wherein the function call is a system call.

4. The computerized method of claim 2, wherein the function call is an application programming interface (API) call.

5. The computerized method of claim 2, wherein the first gadget includes a first sequence of computer instructions and the second gadget includes a second sequence of computer instructions.

6. The computerized method of claim 2, further comprising:
determining whether any valid addresses are present within the portion of the region of allocated memory.

7. The computerized method of claim 2, wherein a valid address is an address in memory of a software component loaded by the application.

8. The computerized method of claim 7, wherein the software component loaded by the application is a dynamically-loaded library (DLL).

9. The computerized method of claim 1, wherein the content of the first gadget is a length of the sequence of one or more computer instructions preceding the return instruction.

10. The computerized method of claim 1, wherein the first gadget includes at least one instruction but less than a threshold number of instructions preceding the return instruction.

11. The computerized method of claim 1, wherein the second gadget includes only Rap the return instruction.

12. The computerized method of claim 2, further comprising:
prior to detecting the function call by the application, detecting a stack discrepancy.

13. The computerized method of claim 12, wherein the detection of the stack discrepancy is accomplished by analyzing a Thread Information Block of the application.

14. The computerized method of claim 2, further comprising:
dynamically configuring a virtual machine with a software image representing a current operating state of a targeted client device, the software image representing content and structure of a storage volume for the targeted client device at a time of configuring the virtual machine; and
detecting the function call, responsive to detecting the function call, analyzing the contents located at one or more of the valid addresses, and determining that the ROP exploit is present within the portion of the region of allocated memory within the virtual machine.

15. The computerized method of claim 14, wherein the virtual machine includes a module, the application and an operating system of the targeted client device.

16. The computerized method of claim 15, wherein the module queries one or more of the application or the operating system to determine what memory has been allocated to the application.

17. A system comprising:
one or more processors;
a storage module communicatively coupled to the one or more processors, the storage module includes logic to:
detect a function call by an application;
responsive to detecting the function call, capture and preserve contents in a range of a stack of memory addresses surrounding a current stack pointer;
analyze contents located at a first valid address within the preserved contents to detect a first gadget and contents located at a second valid address within the preserved contents to detect a second gadget, the first valid address and the second valid address being located within a portion of a region of memory allocated for the application, wherein the first gadget comprises a first sequence of a first number of instructions less than a predetermined number of instructions followed by a return instruction, and the second gadget comprises a second sequence of a second number of instructions less than the predetermined number of instructions followed by a return instruction;
assign a first weight to the first gadget based on the first number of instructions and a second weight to the second gadget based on the second number of instructions, wherein the first weight is different than the second weight; and
determine that a return-oriented programming (ROP) exploit is present within the portion of the region of allocated memory within the preserved contents based on at least whether a combination of at least the first weight and the second weight exceeds a predetermined weight threshold.

18. The system of claim 17, wherein the first gadget includes (1) a sequence of one or more computer instructions other than a return instruction and (2) the return instruction following the sequence of one or more computer instructions, where a number of instructions forming the sequence of one or more computer instructions is less than a predefined threshold.

19. The system of claim 18, wherein the function call is a system call.

20. The system of claim 18, wherein the function call is an application programming interface (API) call.

21. The system of claim 18, wherein a valid address is an address in memory of a software component loaded by the application.

22. The system of claim 21, wherein the software component loaded by the application is a dynamically-loaded library (DLL).

23. The system of claim 18, wherein presence of the ROP exploit is based on a combined weight of all detected gadgets present within the portion of the region of allocated memory.

24. The computerized method of claim 1, wherein the preserved contents includes a copy of the range of the stack of memory addresses surrounding the current stack pointer when the function call is detected.

25. The system of claim 17, wherein the preserved contents includes a copy of the range of the stack of memory addresses surrounding the current stack pointer when the function call is detected.

26. The computerized method of claim 1, wherein the first gadget includes (1) a sequence of one or more computer instructions other than a return instruction and (2) a return instruction following the sequence of one or more computer instructions, where a number of instructions forming the sequence of one or more computer instructions is less than a predefined threshold, and the second gadget includes only a return instruction.

27. The system of claim 17, wherein the first gadget includes (1) a sequence of one or more computer instructions other than a return instruction and (2) a return instruction following the sequence of one or more computer instructions, where a number of instructions forming the sequence of one or more computer instructions is less than a predefined threshold, and the second gadget includes only a return instruction.

28. The method of claim 1, wherein determining the ROP exploit is present is based on at least a combination of the first weight, the second weight and weights of one or more additional gadgets, each detected at valid addresses located within the portion of the region of memory allocated for the application within the preserved contents.

29. The system of claim 18, wherein determining the ROP exploit is present is based on at least a combination of the first weight, the second weight and weights of one or more additional gadgets, each detected at valid addresses located within the portion of the region of memory allocated for the application within the preserved contents.

\* \* \* \* \*